United States Patent [19]

Hasumi et al.

[11] Patent Number: 4,886,703

[45] Date of Patent: * Dec. 12, 1989

[54] MAGNETIC RECORDING MEDIUM

[75] Inventors: Kazuo Hasumi; Hideomi Watanabe; Tsutomu Okita; Katsumi Ryoke; Hideaki Kosha, all of Kanagawa, Japan

[73] Assignee: Fuji Photo Film Co., Ltd., Kanagawa, Japan

[*] Notice: The portion of the term of this patent subsequent to Nov. 14, 2006 has been disclaimed.

[21] Appl. No.: 183,105

[22] Filed: Apr. 19, 1988

[30] Foreign Application Priority Data

Apr. 20, 1987 [JP] Japan .................................. 62-95431

[51] Int. Cl.$^4$ ................................................ G11B 5/70
[52] U.S. Cl. ..................................... 428/323; 428/329; 428/336; 428/408; 428/694; 428/900
[58] Field of Search ............... 428/329, 408, 695, 694, 428/900, 323, 336

[56] References Cited

U.S. PATENT DOCUMENTS

| | | | |
|---|---|---|---|
| 4,132,827 | 1/1979 | Mukaida | 428/900 |
| 4,551,386 | 11/1985 | Yamaguchi | 428/408 |
| 4,562,117 | 12/1985 | Kikukawa | 428/900 |
| 4,629,646 | 12/1986 | Ide | 428/143 |
| 4,634,633 | 1/1987 | Ninomiya | 428/425.9 |
| 4,734,330 | 3/1988 | Oiyama | 428/695 |
| 4,743,501 | 5/1988 | Eguchi | 428/329 |

FOREIGN PATENT DOCUMENTS

| | | | |
|---|---|---|---|
| 008329 | 1/1987 | Japan | 428/694 |
| 208416 | 9/1987 | Japan | 428/694 |
| 208417 | 9/1987 | Japan | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium comprising a support having provided on one surface thereof a magnetic layer comprising a binder and ferromagnetic particles dispersed therein, and on the opposite surface thereof a backing layer comprising a binder and non-magnetic particles dispersed therein, wherein at least one of the binders comprises a vinyl chloride copolymer resin having a vinyl chloride unit content of about 70 wt % or more based on the total amount of the binder, a nitrogen content of about from 0.01 to 1 wt % based on the total amount of the binder, and a polymerization degree of about from 250 to 700; and the non-magnetic particles comprises fine carbon particles having a DBP oil absorption of about 150 ml/100 g or more.

16 Claims, No Drawings

MAGNETIC RECORDING MEDIUM

FIELD OF THE INVENTION

The present invention relates to a magnetic recording medium, and more particularly relates to a highly reliable magnetic recording medium having excellent magnetic characteristics such as screen chroma noise (C/N) or signal/noise ratio (S/N) and reduced drop outs, which is resistant to charging.

The magnetic recording medium of the present invention is suitable for use as a magnetic tape, a magnetic disk, and a magnetic sheet.

BACKGROUND OF THE INVENTION

A magnetic recording medium such as a magnetic tape basically comprises a support such as a polyester film and a coated film (i.e., a magnetic recording layer, hereinafter referred to as "a magnetic layer") coated thereon comprising a coating solution containing ferromagnetic fine particles such as $\gamma\text{-Fe}_2\text{O}_3$, $\text{Fe}_3\text{O}_4$, modified iron oxides thereof, or $\text{CrO}_2$, and a binder of thermoplastic resins, such as a vinyl chloride/vinyl acetate copolymer resin, a vinyl chloride/vinylidene chloride copolymer resin, cellulose type resins, acetal resins, urethane resins, or an acrylonitrile/butadiene copolymer resin, alone or in combination.

Recently, higher recording density and higher reproduced outputs for a short wave length recording have been required for various magnetic recording media, and high efficiency media are desired. In order to satisfy the above requirements and to improve the electromagnetic properties of the magnetic recording medium, not only the surface of the support but also the surfaces of the magnetic layer and a backing layer have been made smoother, and the magnetic recording medium, particularly the magnetic layer and the backing layer, have been made thinner.

Such a magnetic recording medium having an extremely thin magnetic layer and backing layer provided on the smooth surface of a support has poor wear resistance in each layer, poor surface properties, and poor magnetic properties of the magnetic layer such as a residual flux density or a squareness ratio. Further, the magnetic layer is readily damaged and powder-dropping occurs, resulting in staining the parts of the running system of the magnetic recording apparatus and increasing dropouts due to the dusts.

Furthermore, when the above described resins are used as a binder in the magnetic layer, the magnetic layer readily causes negative static charge, resulting in significant dropouts.

When a magnetic recording medium is in the form of a thin film such as a magnetic tape or a magnetic film, it is statically charged and adheres to a magnetic recording head, and dust and contaminants adhered to the medium due to charging cause dropouts, and discharge noises occur.

In order to solve the above problems, carbon black has been added to a magnetic layer and a backing layer to improve their electroconductivity and to prevent charging. However, when carbon black is added n a large amount, problems are caused due to poor dispersibility of carbon black in each layer. That is, the surface properties of each layer and S/N of the magnetic recording medium are deteriorated. When the magnetic recording medium is a magnetic tape, unevenness on the surface of the backing layer prints through on the surface of the magnetic layer upon winding the tape, resulting in deterioration of the electromagnetic properties of the magnetic recording medium.

The binder itself in each layer can be improved so that the magnetic layer and the backing layer may resist charged, but such improvements have been insufficient to prevent charging, and the addition of carbon black is still necessary.

SUMMARY OF THE INVENTION

One object of the present invention is to provide a magnetic recording medium having excellent magnetic characteristics, such as C/N or S/N, and reduced dropouts.

Another object of the invention is to provide a magnetic recording medium with improved resistance to charging.

Other objects of the present invention will be apparent from the following description.

It has now been discovered that the dispersibility of ferromagnetic particles can be improved by using nitrogen containing polyvinyl chloride resin as a binder for a magnetic layer and/or a backing layer, thereby making the magnetic layer strong, improving running durability of the magnetic recording medium and remarkably reducing the charging potentials of a magnetic layer and backing layer, thereby decreasing dropouts and improving S/N and C/N.

Accordingly, the present invention relates to a magnetic recording medium comprising a support having provided on one surface thereof a magnetic layer comprising a binder and ferromagnetic particles dispersed therein, and on the opposite surface thereof a backing layer comprising a binder and non-magnetic particles dispersed therein, wherein at least one of the binders comprises a vinyl chloride copolymer resin having a vinyl chloride unit content of about 70 wt. % or more based on the total amount of the binder, a nitrogen content of about from 0.01 to 1 wt. % based on the total amount of the binder, and a polymerization degree of about from 250 to 700; and the non-magnetic particles comprises fine carbon particles having a DBP oil absorption of about 150 ml/100 g or more. In a preferred embodiment, the present invention relates to the above-described magnetic recording medium in which the magnetic recording layer contains fine carbon particles in an amount of about 5 wt. % or less of the amount of the ferromagnetic particles.

DETAILED DESCRIPTION OF THE INVENTION

The present invention illustrated in more detail as follows.

Examples of the non-magnetic support used in the present invention include polyesters such as polyethylene terephthalate or polyethylene naphthalate; polyolefins such as polypropylene; cellulose derivatives such as cellulose triacetate or cellulose diacetate; vinyl resins such as polyvinyl chloride; other plastic films such as polycarbonates, polyamide resins, or polysulfone resins; metallic materials such as aluminum or copper; and ceramics such as glass. These supports may be subjected to conventional pre-treatments such as corona discharge treatment, plasma treatment, undercoating treatment, heat treatment, metal vapour-deposition treatment, or alkaline treatment. The thickness of the non-magnetic support is preferably from 5 to 100 μm, more preferably from 5 to 50 μm, and most preferably from 5 to 30 μm.

The magnetic layer provided on one surface of the support basically comprises ferromagnetic particles and a binder used for bonding the ferromagnetic particles to form a layer.

Examples of the ferromagnetic particles include γ-$Fe_2O_3$, Co-containing γ-$Fe_2O_3$, $Fe_3O$, Co-containing $Fe_3O$, γ-$FeOx$ (1.33 < X ≦ 1.50), Co-containing γ-$FeOx$ (1.33 < X ≦ 1.50), $CrO_2$, Co-Ni-P alloy, Co-Ni-Fe alloy, Fe-Ni-Zn alloy, Ni-Co alloy, Co-Ni-Fe-Be alloy, and tabular hexagonal barium ferrite. These ferromagnetic particles preferably have an average particle size of from about 0.005 to 2 μm, more preferably from 0.005 to 0.5 μm, an average ratio of long axis/axis width ("aspect ratio") of from 1/1 to 50/1, more preferably from 4/1 to 20/1, and an average specific surface area of about from 1 to 70 $m^2/g$, more preferably from 30 to 70 $m^2/g$. Conventional dispersing agents, lubricating agents, antistatic agents and the like may be absorbed on to the surface of the ferromagnetic particles by soaking in a solvent prior to dispersion.

The above described ferromagnetic particles are homogeneously dispersed in a binder solution, and the resulting solution is coated and dried to form a magnetic layer.

A backing layer is provided on the other surface of the support to prevent charging, print through of magnetic recording, and wow and flutter, and to improve the strength and running properties of the magnetic recording medium, particularly when plastic materials is used as the non-magnetic support. The backing layer basically comprises a binder for bonding non-magnetic particles to form a layer, and in particular carbon fine particles having a DBP oil absorption amount of about 150 ml/100 g or more, preferably from 150 to 1,500 ml/100 g, and more preferably from 180 to 400 ml/100 g is used as the non-magnetic particles. The carbon fine particles include those having a particle diameter of from about 1 to 500 mμ, such as graphite, carbon black, or carbon black graphite polymers. When non-magnetic particles having a DBP oil absorption amount of less than about 150 ml/100 g are used, the backing layer has a low electroconductivity and causes dropout problems, thereby decreasing the reliability of the magnetic recording medium. Accordingly, when such carbon fine particles are added to the magnetic layer, the particles preferably have the same characteristics (i.e., a DBP oil absorption amount of 150 ml/100 g or more) as those in the backing layer, are added to the magnetic layer preferably in an amount of about 5 wt. % or less, preferably from 1 to 5 wt. %, based on the weight of the ferromagnetic particles contained in the layer.

The DBP oil asorption amount is represented in terms of an amount of dibutylphthalate absorbed by 100 g of a dry sample, and is defined specifically in JIS K6221-1970.

Other non-magnetic particles can be optionally added to the backing layer in an amount of preferably from 1 to 10 wt. %, more preferably from 3 to 8 wt. %, based on the amount of the magnetic particles. Examples thereof include solid lubricating agent particles or antistatic agent particles, having an average particle diameter of about 0.8 μm or less, and preferably 0.4 μm or less. Specific examples of such non-magnetic particles include α-alumina, chromium oxide, titanium oxide, barium sulfate, calcium carbonate, silica, talc, molybdenum disulfide, tungsten disulfide, boron nitride, iron oxide, magnesium oxide, zinc oxide, and calcium oxide.

The above non-magnetic particles are homogeneously dispersed in a binder solution for bonding particles to form a layer, and the resulting solution is coated and dried to form a backing layer.

In the present invention, at least one of binders used in the magnetic layer and the baking layer is a vinyl chloride copolymer containing about 70 wt. % or more of vinyl chloride monomer units, a nitrogen content of about from 0.01 to 1 wt. %, and optionally other copolymer containing about 30 wt. % or less of copolymerizable monomer units, and a degree of polymerization of about from 250 to 700. Specific examples of the vinyl chloride copolymer include nitrogen containing vinyl chloride copolymer resins substituted with groups including mono-substituted amino groups, di-substituted amino groups, or ammonium groups. Preferred examples of the vinyl chloride copolymer are represented by formula (I):

$$-(CH_2CHCl)_m-(CH_2CHX)_n- \quad (I)$$

In formula (I), X represent $-NHR_1$, $-NR_1R_2$, 

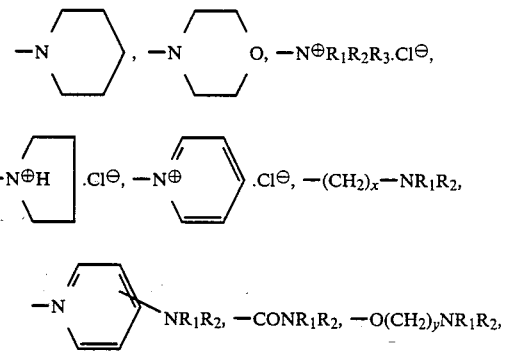

wherein $R_1$, $R_2$ and $R_3$, which may be the same or different, each represents an alkyl group having from 2 to 5 carbon atoms, a phenyl group, a phenyl group substituted with an alkyl group having from 1 to 5 carbon atoms or a hydroxyalkyl group having from 1 to 5 carbon atoms, m represents an integer of 70 or more, n represents an integer of from 0 to 30, provided that m+n is 100 or less, and x and y, which may be the same or different, each represents an integer of from 1 to 10.

The above described resins of nitrogen-containing vinyl chloride copolymers substituted with groups such as mono-substituted amino group, a di-substituted amino group, or ammonium group can be prepared by various conventional methods, for example, by copolymerizing vinyl chloride, a nitrogen-containing monomer (such as those mentioned above), and other comonomers, or by substituting adding a primary amine, secondary amine, or tertiary amine for a Cl group in molecules of a polyvinyl chloride resin. The synthesis method therefor is known, for example, as disclosed in Takayuki Ootsu, Kobunshi Gosei Jikkenho (Experiments for synthesizing high molecular compounds), (Kagaku Dojinsha, 1972), and can be applied in the present invention.

Examples of the amine compounds used for the above methods in the present invention include primary, secondary, and tertially amines such as aliphatic amines, acyclic amines or aromatic amines. Specific examples thereof include ethylamine, propylamine, butylamine, cyclohexylamine, ethanolamine, naphthylamine, aniline, o-toluidine, dimethylamine, diethylamine, dipropylamine, dibutylamine, dioctylamine, diisobutylamine, diethanolamine, N-methylaniline, trimethylamine, triethylamine, triisobutylamine, tridecylamine, N-methyldiphenylamine, hexamethylenetetramine, triethanolamine, tributylamine, pyridine, α-picoline, β-picoline, γ-picoline, 2,4-lutidine, quinoline, and morpholine.

A particularly preferred nitrogen containing resin prepared by these methods comprises about from 70 to 98 wt. % vinyl chloride monomer units, about from 0.01 to 5 wt. % of nitrogen containing monomers containing an amine, and the balance of other copolymerizable monomers in a small amount. Examples of the copolymerizable monomer include vinyl alcohol, (meth)acrylates, (meth)acrylic acid, maleic anhydride, etc. The average degree of polymerization thereof is about from 250 to 700, preferably from 300 to 500. When the proportion of vinyl chloride is too small, the physical strength of the magnetic layer decreases. When it is too large, the solubility to solvents decreases, which is unfavorable for preparing a coating solution. When the proportion of amine-modified (i.e., nitrogen containing) monomer unit is too small, the dispersibility of the ferromagnetic particles decreases, thereby decreasing the smoothness of the surface of the magnetic layer. When it is too large, not only dispersibility and smoothness but also the solubility decrease, and as a result, the resin can not be used as a binder. When the average degree of polymerization of the above-described resin of copolymer composed of each unit is too low, the physical strength of the magnetic layer decreases, that is, the magnetic layer becomes fragile, and durability of the magnetic recording medium also decreases. On the other hand, when the average degree of polymerization is too high, the viscosity of the coating solution at a predetermined concentration increases, which is unfavorable for handling the resin.

SYNTHESIS EXAMPLES

Nitrogen containing vinyl chloride copolymer resins (I) to (IV) were synthesized in accordance with the synthesis method as disclosed in Ootsu, Kobunshi Gosei Jikkenho cited above. The compositions, the degrees of polymerization, and the nitrogen contents are shown in Table 1. The contents of nitrogen were measured in accordance with the Kjehldahl Method as disclosed in Tsugio Takeuchi, *Kogyo Bunseki Kagaku* (Industrial Analysis Chemistry), vol. 2, pp. 331 to 336 by (Gakujutsushuppansha, 1970).

TABLE 1

| Resin No. | Unit of vinyl chloride (wt %) | Unit of nitrogen containing monomer (wt %) | | Unit of another copolymer (wt %) | | Degree of polymerization | Nitrogen content (%) |
|---|---|---|---|---|---|---|---|
| I | 86.0 | $-(CH_2CH)-$ with N attached to $O=C$ in ring | 0.3 | $-(CH_2CH)-$ $OCOCH_3$ | 13.7 | 600 | 0.038 |
| II | 80.0 | $-(CH_2CH)-$ with N in morpholine ring (O) | 0.1 | $-(CH_2CH)-$ $OH$ | 2.9 | 420 | 0.010 |
| | | | | $-(CH_2CH)-$ $OCOCH_3$ | 17.0 | | |
| III | 92.0 | $-(CH_2CH)-$ $N^+$ pyridinium $Cl^-$ | 0.8 | $-(CHCH)-$ $O=C\ C=O$ $\backslash O /$ | 1.2 | 470 | 0.080 |
| | | | | $-(CH_2CH)-$ $OCOCH_3$ | 6.0 | | |
| IV | 86.0 | $-(CHCH)-$ $O=C\ C=O$ $\backslash N /$ $CH_3$ | 0.7 | $-(CH_2CH)-$ $OCOCH_3$ | 10.6 | 290 | 0.100 |
| | | | | $-(CH_2CH)-$ $COOCH_2CHCH_2$ (epoxide O) | 2.7 | | |

100 parts by weight of a vinyl chloride/vinyl acetate/maleic acid copolymer reisn (400X100A, a trademark produced by Nippon Zeon Co., Ltd., polymerization degree is 430, weight average molecular weight is 70,000, number average molecular weight is 30,000, and copolymerization ratios of vinyl chloride, vinyl acetate, and maleic acid are 85, 10, and 5, respectively), 200 parts by weight of methanol, 200 parts by weight of toluene, 10 parts by weight of sodium hydroxide, and 20 parts by weight of diethanolamine were put in a reaction vessel and reacted at 50° C. for 10 hours. The reaction product was washed with 1,000 parts by weight of methanol 5 times, and with 1,000 parts by weight of distilled water 3 times, and dried to obtain Nitrogen containing vinyl chloride type copolymer resin (V). The nitrogen content thereof was 0.08%.

When the amine compounds used in synthesizing the nitrogen containing resin of the present invention are simply added without being reacted with the polymer into the composition for forming a magnetic layer comprising ferromagnetic particles and a conventional binder, and dispersed therein and coated to form a magnetic layer, the dispersibility of the ferromagnetic particles and the smoothness of the surface of the magnetic layer are slightly improved, but dispersibility decreases with passage of time, and the objects of the present invention cannot be attained.

When the above described resin is used as a binder, another resins may be used in combination in the same amount as the above resins or less if necessary. Examples of such resins include polyurethane resins, nitrocellulose, polyester resins, epoxy resins, polyamide resins, phenol resins, alkyd resins, polyvinyl butyral resins, and polymers or copolymers of acrylic acid esters, methacrylic acid ester, styrene, acrylonitrile, butadiene, ethylene, propylene, and vinylidene chloride. Polyurethane resins, epoxy resins, and nitrocellulose are particularly preferred.

Polyisocyanate type hardening agents are preferably used in combination with the above binders. Examples of such hardening agents include polyfunctional isocyanate and urethane prepolymers having isocyanate groups at both ends, which are available under the trade names of "Collonate L", "Collonate HL", "Collonate 2030", "Collonate 2031", "Collonate 2036", "Collonate 3015", "Collonate 2014", "Millionate MR", "Millionate MTL", "Dult Sec 1350", "Dult Sec 2170"and "Dult Sec 2280" produced by Nippon Polyurethane Industries Co., Ltd., and "Desmodule L" produced by West German Bayer Co., Ltd. These hardening agents are preferably used in an amount of from about 5 to 40 parts by weight based on 100 parts by weight of the binder.

In the composition of the coating solution for forming a magnetic layer or a backing layer, the binder is preferably used in an amount of from about 15 to 100 parts by weight, more preferably from 15 to 50 parts by weight, and most preferably from 18 to 35 parts by weight, per 100 parts by weight of the total amount of the ferromagnetic particles and the non-magentic particles.

A specific example of the binder composition comprises the nitrogen containing resin of the present invention in an amount of about from 10 to 60 wt. %, a urethane resin or an epoxy resin in an amount of about from 10 to 90 wt. %, a polyisocyanate in an amount of about from 5 to 60 wt. %, and a polyamide in an amount of from 0 to about 50 wt. %. A particularly preferred binder composition comprises amine modified vinyl chloride resin (i.e., nitrogen containing resin) in an amount of about from 30 to 60 wt. %, a urethane resin or an epoxy resin in an amount of about from 20 to 65 wt. %, a polyisocyanate in an amount of about from 20 to 50 wt. %, and a polyamide in an amount of from 0 to about 30 wt %.

Additives such as lubricating agents, abrasive agents, dispersing agents, antistatic agents, or rust-preventing agents may be added into the coating solution for forming a magnetic layer in addition to the above described ferromagnetic particles and binders.

Examples of the lubricating agents include saturated or unsaturated higher fatty acids, fatty acid esters, higher fatty acid amides, higher fatty acid alcohols, silicon oil, graphite, molybdenum disulfide, tungsten disulfide, boron nitride, florinated graphite, fluorine alcohols, polyolefins, polyglycols, alkyl phosphoric esters, and polyphenyl ethers. These lubricating agents may be added in an amount of about from 0.05 to 20 parts by weight per 100 parts by weight of the binder.

Examples of the abrasive agent include α-alumina, fused alumina, chromic oxide, corondum, α-iron oxide, silicon nitride, boron nitride, silicon carbide, molybdenum carbide, boron carbide, tungsten carbide diatomaceous earth, and dolomite, which have a Moh's hardness of about 6 or more and an average particle size of about from 0.005 to 5 μm. These abrasive agents may be used alone or in combination in an amount of about from 0.01 to 20 parts by weight per 100 parts by weight of the binder.

Examples of the dispersing agents include fatty acids having from 10 to 22 carbon atoms such as caprylic acid, capric acid, lauric acid, myristic acid, palmitic acid, stearic acid, oleic acid, elaidic acid, linolic acid, linolenic acid or stearol acid, alkali metals or alkali earth metals of the above fatty acids, copper or lead metal soaps thereof, lecithin, higher alcohols, and sulfates or phosphates of the above alcohols. These dispersing agents may be sued alone or in combination in an amount of about from 0.005 to 20 parts by weight per 100 parts by weight of the binder.

Examples of the antistatic agents include natural surface active agents such as saponin, nonionic surface active agents such as alkylene oxide type agents, glycerine type agents, glycidol type agents, polyhydric alcohol type agents or polyhydric alcohol esters, cationic surface active agents such as higher alkylamine, cyclic amine, hidantoin derivatives, amideamine, esteramide, quaternary ammonium salts, pyridine, other heterocyclic compounds, phosphoniums or sulphoniums, anionic surface active agents such as carboxylic acid, sulfonic acid, phosphoric acid, or compounds having an acid group such as a sulfuric acid ester or a phosphoric acid ester, and amphoteric surface active agents such as amino acids, aminosulfonic acids, sulfuric acid esters of aminoalcohols or alkyl betaine type agents. These surface active agents may be used alone or in combination in an amount of about from 0.01 to 10 parts by weight per 100 parts by weight of the ferromagnetic particles. The above described antistatic agents can be also used to improve dispersing properties, magnetic characteristics, and lubricating properties, and can be used as a coating aid.

The above described additives may be added into the coating solution for forming a magnetic layer or may be coated or sprayed on the surface of he magnetic layer with or without organic solvents or dispersing media after the magnetic layer is dried.

As described above, the coating solutions for forming a magnetic layer or a backing layer can be prepared by dissolving the binder in a solvent, adding ferromagnetic or non-ferromagnetic particles into the resulting solution, stirring and uniformly dispersing the solution.

Examples of the solvents for preparing a binder solution include ketone type solvents such as acetone, methyl ethyl ketone, methylisobutyl ketone, cyclohexanone, isophorone or tetrahydrofuran; alcohol type solvents such as methanol, ethanol, propanol, butanol, isobutyl alcohol, isopropyl alcohol or methylhexanol; ester type solvents such as methyl acetate, ethyl acetate, butyl acetate, isobutyl acetate, isopropyl acetate, ethyl lactate or monoethyl ether of glycol acetate; glycol ether type solvents such as ether, glycol dimethylether, glycol monomethylether or dioxane; aromatic hydrocarbon type solvents such as benzene, toluene, xylene, cresol, chlorobenzene or styrene; chlorinated hydrocarbon type solvents such as methylene chloride, ethylene chloride, carbon tetrachloride, chloroform, ethylene chlorohydrin or dichlorobenzene; N,N-dimethylformamide; and hexane.

These organic solvents are selected so that they can wholly dissolve substances which must be dissolved. When they are used in the form of a mixed solvent, selection of the solvents and the ratios of each solvent to be mixed can be suitably determined by one skilled in the art. These solvents should not deteriorate the characteristics of the ferromagnetic or non-magnetic particles.

For dissolving and dispersing each component in organic solvents, a two-roll mill, a three-roll mill, a ball mill, a pebble mill, a tron mill, a sand grinder, an attritor, a high speed impeller, a dispersing device, a high speed stone mill, a high speed impact mill, a disper, a kneader, a high speed mixer, a ribbon blender, a cokneader, an intensive mixer, a tumbler, a blender, a disperser, a homogenizer, and an ultrasonic dispersing device can be used.

Various coating methods, such as an air doctor coating method, a blade coating method, an air knife coating method, a squeeze coating method, an impregnating method, a reverse roll coating method, a transfer roll coating method, a gravure coating method, a cast coating method, or a spray coating method, can be employed to coat the coating solutions for forming a magnetic layer or a backing layer on a support after the dispersing process is completed.

After the coating solution for forming a magnetic layer is coated on the support, it is dried by various conventional drying methods using conventional apparatuses. Drying operations are conventionally known techniques.

The thickness of the thus coated layer should be as thin as possible so that recording density per unit volume of a magnetic recording medium can be increased.

The dry thickness of the magnetic layer is preferably from 0.6 to 12.5 μm. The dry thickness of the backing layer is preferably from 0.3 to 2 μm.

The thus formed magnetic layer or backing layer is subjected to calendering treatment if desired. In this case, super calendering treatment and the like which are conventionally used in the field of paper manufacturing industries can be used.

The magnetic recording media thus formed are cut to a desired shape to form a magnetic tape, a magnetic disk, a magnetic sheet or the like.

Accordingly, the present invention is easily manufactured by one skilled in this art using the above conventional technologies.

The present invention will be illustrated in more detail with reference to the following specific Examples and Comparative Examples, but the present invention is not to be construed as being limited thereto. The results of tests on each sample are shown in Table 2. In the Examples and Comparative Examples, all parts percents and ratios are by weight, unless otherwise indicated.

EXAMPLE 1

A coating solution for forming a magnetic layer having the following composition was prepared and coated on a support of a polyethylene terephthalate film having a thickness of 10 μm, subjected to magnetic orientation using cobalt magnets, and dried in an atmosphere of 100° C. to form a magnetic layer having a dry thickness of 4.5 μm.

| Preparation for a coating solution of magnetic layer: | |
|---|---|
| Composition: | |
| Ferromagnetic Fe—Ni alloy particles (Ni content: about 5 wt %, specific surface area $S_{BET}$: 45 m$^2$/g) | 100 parts |
| Vinyl chloride copolymer resin (I) | 12 parts |
| Polyurethane resin "Nippon N2301" (trade name, manufactured by Nippon Polyurethane Co., Ltd.) | 8 parts |
| Polyisocyanate resin "Collonate L" (trade name, manufactured by Nippon Polyurethane Co., Ltd.) | 8 parts |
| Stearic Acid | 2 parts |
| Octyl laurate | 1 part |
| α-alumina (Moh's hardness: 9, average particle size: 0.25 μm) | 6 parts |
| Carbon black (average particle size: 40 mμ, DBP Oil absorption amount: 160 ml/100 g) | 3 parts |
| Methyl ethyl ketone | 300 parts |

The above components were put in a ball mill, processed for 50 hours, mixed and dispersed sufficiently to prepare a coating solution for a magnetic layer.

A coating solution for forming a backing layer having the following composition was coated on the surface of the support opposite to the magnetic layer, and dried in the same manner as the magnetic layer to form a backing layer having a dry thickness of 2 μm.

| Composition of a coating solution of a backing layer: | |
|---|---|
| Carbon black (average particle size: 20 mμ, DBP oil absorption amount: 200 ml/100 g) | 100 parts |
| Carbon black "Leven MTP" (a trade name, manufactured by U.S. Columbian Carbon Co., Ltd., average particle size: 250 mμ, DBP oil absorption amount: 40 ml/100 g) | 30 parts |
| Polyurethane resin "Nipporan N2304" (a trade name, manufactured by Nippon Polyurethane Co., Ltd.) | 30 parts |
| Polyvinylidene chloride "Saran", (a trade name, manufactured by U.S. Dow Chemical Co., Ltd.) | 30 parts |
| Copper Oleate | 0.2 part |
| Methyl ethyl ketone | 800 parts |

The above composition was put in a ball mill, mixed kneaded and dispersed, then 10 parts of polyisocyanate compound "Collonate 2061" (a trade name, manufactured by Nippon Polyurethane Co., Ltd.) was added thereto, and uniformly mixed and dispersed to prepare a coating solution of a backing layer.

Thereafter, both layers were subjected to calendering treatment and cut to a tape having a ½ inch width to prepare VHS type video tape. The tape obtained was identified as Sample No.1.

EXAMPLE 2

The following composition was put in a co-kneader and sufficiently mixed and kneaded.

| Composition of a coating solution of a magnetic layer: | |
|---|---|
| Co-containing $\gamma$-Fe$_2$O$_3$ particles (Co content: 3 wt % based on Y-Fe$_2$O$_3$, Fe$^{2+}$ content: 5 wt % based on Fe$^{3+}$, Nitrogen absorption specific surface area: 35 m$^2$/g) | 100 parts |
| Vinyl chloride copolymer (II) | 10 parts |
| Polyurethane resin "C-7209" (a trade name, produced by DAINIPPON INK AND CHEMICAL, INC.) | 10 parts |
| Lecithin | 1 part |
| Myristic acid | 3 parts |
| Ethyl stearate | 3 parts |
| Lauric acid | 3 parts |
| Cromium oxide (Moh's hardness: 8, average particle size: 30 m$\mu$) | 8 parts |
| Butyl acetate | 400 parts |
| Methyl ethyl ketone | 200 parts |

The above composition was put in a ball mill, mixed, kneaded, and dispersed, and thereafter 20 parts of polyisocyanate compound "Desmodule L-75" (a trade name, manufactured by West German Bayer Co., Ltd.) was added thereto, and uniformly mixed and dispersed and the viscosity of the resulting solution was adjusted, and the solution for forming a magnetic layer was prepared.

The thus prepared coating solution was coated on a support of a polyethylene terephthalate film in a dry thickness of 4.5 $\mu$m, and subjected to magnetic orientation and dried to form a magnetic layer.

The same coating solution for the backing layer as used in Example 1, except that 120 parts of carbon black "Conductex SC" (a trade name, manufactured by U.S. Columbian Carbon Co., Ltd., average particle size: 30 $\mu$m, DBP oil absorption amount: 200 ml/100 g) was added to the composition, was coated on the surface of the support opposite to the above described magnetic layer to form a backing layer, in the same manner as in Example 1.

Thereafter, both magnetic and backing layers were subjected to calendering treatment and cut to a tape having a ½ inch width to prepare a VHS type video tape. The tape obtained was identified as Sample No. 2.

EXAMPLE 3

The same coating solution for a magnetic layer as used in Example 1, except that 10 parts of Vinyl chloride copolymer (III) was used instead of 8 parts of Vinyl chloride copolymer (I) and 20 parts of a -COOH group-substituted polyurethane resin "TIM-3003" (a trade name, manufactured by Sanyo Chemical Industries, Ltd.) was used instead of 8 parts of polyurethane resin "Nipporan N-2301", was coated in the same manner as in Example 1 to prepare a video tape. The tape obtained was identified as Sample No. 3.

EXAMPLE 4

The same coating solution for a magnetic layer as used in Example 2, except that 9 parts of Vinyl chloride copolymer (IV) was used instead of 15 parts of vinyl chloride copolymer [II], 20 parts of an —SO$_3$Na group-substituted polyurethane "Byron UR-8300" (a trade name, manufactured by TOYOBO CO., LTD.) was used instead of 10 parts of polyurethane resin "C-7209", and 3 parts of phenoxy resin "PKHH" (a trade name, manufactured by U.S. Union Carbide Co., Ltd.) was additionally used, was coated in the same manner as in Example 1 to prepare a video tape. The tape obtained was identified as Sample No. 4.

COMPARATIVE EXAMPLE 1

The same coating solution for a magnetic layer as used in Example 1, except that vinyl type resin "400X-110A" (a trade name, manufactured by Nippon Zeon Co., Ltd.) was used instead of 8 parts of Vinyl chloride type copolymer (I), was coated to prepare a video tape in the same manner as in Example 1. The tape obtained was identified as Comparative Sample A.

EXAMPLE 5

The same coating solution for a magnetic layer as used in Example 1, except that Vinyl chloride copolymer (V) was used instead Vinyl chloride type copolymer (I) and carbon black "Denka Black" (a trade name, manufactured by DENKI KAGAKU KOGYO KABUSHIKI KAISHA, average particle size: 50 m$\mu$, DBP oil absorption amount: 180 ml/100 g) was used to prepare a video tape in the same manner as in Example 1. The tape obtained was identified as Sample No. 5.

COMPARATIVE EXAMPLE 2

The same procedure as in Example 5 was repeated to prepare a video tape using the same coating solution for a magnetic layer as in Example 5, except that 10 parts of carbon black was used instead of 3 parts thereof and the same coating solution of a backing layer as in Example 5 except that carbon black "Asahi #80" (a trade name, manufactured by Asahi Carbon Co., Ltd., Average particle size: 20 m$\mu$, DBP oil absorption amount: 120 ml/100 g) was used instead of the first carbon black. The tape obtained was identified as Comparative Sample B.

The characteristics of each sample thus obtained were measured and the results thereof are shown in Table 2.

Measurement Method (1) Screen chroma noise (C/N):

Screen signals of image signals 30 IRE superimposed with carrier waves amplitude of 100% were recorded at a standard recording current. These signals were reproduced through a high frequency filter of 1 kHz and a low frequency filter of 500 kHz and the AM component of the chroma noise in the reproduced signals was measured using a noise measuring device. The screen chroma noise of the samples is shown in terms of relative decibel (dB) values when the chroma noise of Sample 1 of the present invention is a standard dB value.

(2) Drop Out

Drop out is shown by the number of drop outs per minute which occurred after the repeated usage of 10 passes. Drop out was counted by a drop out counter when the reproduced output level decreased by 16 dB or more for $5 \times 10^{-6}$ sec or more.

TABLE 2

| Sample No. of Example and Comparative Example | Specific surface area of ferromagnetic particles (S-bet) | Oil absorption amount of carbon black (ml/g) | ratio of ferromagnetic particles/ binder (weight ratio) | Nitrogen containing vinyl chloride resin (weight %) | ratio of polyurethane resin/ nitrogen containing vinyl chloride resin (weight ratio) | Amount of carbon black in magnetic layer based on ferromagnetic particles (weight %) | Characteristics of magnetic recording medium | | |
|---|---|---|---|---|---|---|---|---|---|
| | | | | | | | charged voltage (V) | C/N (dB) | Dropouts (number/min.) |
| 1 | 45 | 160 | 100/20 | 60 | 3/2 | 3 | +5 | +0.1 | 5 |
| 2 | 35 | 200 | 100/20 | 50 | 1/1 | 0 | 0 | +0.3 | 7 |
| 3 | 45 | 160 | 100/30 | 33.3 | 3/2 | 3 | +5 | +0.6 | 4 |
| 4 | 35 | 160 | 100/22 | 75 | 9/10 | 0 | +3 | +0.5 | 6 |
| 5 | 45 | 180 | 100/20 | 60 | 3/2 | 3 | −5 | +0.5 | 5 |
| A | 45 | 160 | 100/20 | 0 | 3/2 | 3 | −300 | 0 | >100 |
| B | 45 | 120 | 100/20 | 60 | 3/2 | 10 | +5 | −3.0 | 80 |

It is clear from the results shown in Table 2 that the samples of the present invention exhibit extremely low charged voltage, high C/N, and small numbers of dropouts per unit time.

In the present invention, because a nitrogen containing polyvinyl chloride resin is used as a binder for a magnetic layer or a backing layer of the magnetic recording medium, the present invention is very effective, since dispersibilities of ferromagnetic and non-magnetic particles dispersed in each layer can be improved, thereby remarkably improving the strength and running durability of each layer, remarkably reducing the charging of each layer and strikingly reducing the number of dropouts.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a support having provided on one surface thereof a magnetic layer comprising a binder and ferromagnetic particles dispersed therein, and on the opposite surface thereof a backing layer comprising a binder and non-magnetic particles dispersed therein, wherein at least one of said binders comprises a vinyl chloride copolymer resin having a vinyl chloride unit content of about 70 wt. % or more based on the total amount of said binder, a nitrogen content of about from 0.01 to 1 wt. % based on the total amount of said binder, and a polymerization degree of about from 250 to 700; and said non-magnetic particles comprises fine carbon particles having a DBP oil absorption of about 150 ml/100 g or more, a particle diameter of from 1 to 500 mμ, and being selected from the group consisting of graphite, carbon black, and carbon black graphite polymer, wherein said vinyl chloride copolymer resin contains a heterocyclic group containing a nitrogen atom directly connected to the vinyl group of the vinyl chloride copolymer resin.

2. A magnetic recording medium as claimed in claim 1, wherein said magnetic layer further comprises fine carbon particles in an amount of about 5 wt. % or less of the amount of said ferromagnetic particles.

3. A magnetic recording medium as claimed in claim 2, wherein said magnetic layer further comprises fine carbon particles in an amount of from 1 to 5 wt. % or less of the amount of said ferromagnetic particles.

4. A magnetic recording medium as claimed in claim 1, wherein said fine carbon particles have a DBP oil absorption of from 150 to 1,500 m/1100 g.

5. A magnetic recording medium as claimed in claim 4, wherein said fine carbon particles have a DBP oil absorption of from 150 to 400 ml/100 g.

6. A magnetic recording medium as claimed in claim 1, wherein said vinyl chloride copolymer resin comprises from 70 to 98 wt. % of vinyl chloride monomer units, and from about 0.01 to 1 wt. % of monomer units containing said amine.

7. A magnetic recording medium as claimed in claim 1, wherein said vinyl chloride copolymer resin has an average polymerization degree of from 250 to 700.

8. A magnetic recording medium as claimed in claim 7, wherein said vinyl chloride copolymer resin has an average polymerization degree of from 300 to 500.

9. A magnetic recording medium as claimed in claim 1, wherein said magnetic layer comprise from about 15 to 100 parts by weight of said vinyl chloride copolymer resin as a binder per 100 parts by weight of the total amount of said ferromagnetic particles and any non-magnetic carbon particles contained in said magnetic layer; and said backing layer comprises from about 15 to 100 parts by weight of said vinyl chloride copolymer resin as a binder per 100 parts by weight of said non-magnetic carbon particles and any other non-magnetic particles contained in said backing layer.

10. A magnetic recording medium as claimed in claim 9, wherein said magnetic layer comprises from 15 to 50 parts by weight of said vinyl chloride copolymer resin as a binder per 100 parts by weight of the total amount of said ferromagnetic particles and any non-magnetic carbon particles contained in said magnetic layer; and said backing layer comprises from 15 to 50 parts by weight of said vinyl chloride copolymer resin as a binder per 100 parts by weight of said non-magnetic carbon particles and any other non-magnetic particles contained in said backing layer.

11. A magnetic recording medium as claimed in claim 10, wherein said magnetic layer comprises from 18 to 35 parts by weight of said vinyl chloride copolymer resin as a binder per 100 parts by weight of the total amount of said ferromagnetic particles and any non-magnetic carbon particles contained in said magnetic layer; and said backing layer comprises from 18 to 35 parts by weight of said vinyl chloride copolymer resin as a binder per 100 parts by weight of said non-magnetic carbon particles and any other non-magnetic particles contained in said backing layer.

12. A magnetic recording medium as claimed in claim 1, wherein said binder comprises said vinyl chloride copolymer resin in an amount of from 10 to 60 wt. %, at least one of a urethane resin and an epoxy resins in an amount of from 10 to 90 wt. %, a polyisocyanate in an amount of from 5 to 40 wt. %, and a polyamide in an amount of 50 wt. % or less.

13. A magnetic recording medium as claimed in claim 12, wherein said binder comprises said vinyl chloride copolymer resin in an amount of from 30 to 60 wt. %, said at least one of a urethane resin and an epoxy resin in an amount of from 20 to 65 wt. %, said polyisocyanate in an amount of from 20 to 50 wt. %, and said polyamide in an amount of 30 wt. % or less.

14. A magnetic recording medium as claimed in claim 1, wherein said magnetic layer has a dry thickness of from 0.6 to 12.5 μm.

15. A magnetic recording medium as claimed in claim 1, wherein said backing layer has a dry thickness of from 0.3 to 2 μm.

16. A magnetic recording medium as claimed in claim 1, wherein said nitrogen is contained in an amine selected from the group consisting of aniline, o-toluidine, N-methylaniline, pyridine, α-picoline, β-picoline, γ-picoline, 2,4-lutidine, quinoline and morpholine.

* * * * *